United States Patent [19]

Takeda et al.

[11] Patent Number: 5,063,532
[45] Date of Patent: Nov. 5, 1991

[54] ACTIVE FILTER DEVICE

[75] Inventors: Masatoshi Takeda; Tomohiko Aritsuka; Yoshitaka Tachibana, all of Hyogo, Japan

[73] Assignee: Mitsubishi Denki Kabushiki Kaisha, Tokyo, Japan

[21] Appl. No.: 285,611

[22] Filed: Dec. 16, 1988

[30] Foreign Application Priority Data

Mar. 4, 1988 [JP] Japan .................................. 63-52035

[51] Int. Cl.[5] .......................................... H02M 7/539
[52] U.S. Cl. .................................... 364/825; 363/41; 363/97; 364/161
[58] Field of Search ........................ 328/162, 165, 167; 307/105; 363/39, 40, 41, 95, 96, 97; 364/825, 161, 162; 323/283

[56] References Cited

U.S. PATENT DOCUMENTS 4,626,769 12/1986 Valley et al. ................... 364/162 X
4,823,251 4/1989 Kawabata et al. ..................... 363/95

OTHER PUBLICATIONS

Choe, G. H. et al., "A New Injection Method for AC Hanuonic Elimination by Active Power Filter", IEEE Trans on Indust. Electron., vol. 35, No. 1, Feb. 1988, pp. 141-147.

Takamitsu et al., "Outdoor Self-Cooling Voltage-Type Active Filter", Apr. 1984, pp. 1-72-1-74 and Translation, pp. 1-8, Study Report of the Institutes of Electrical and Information of Japan in 1984.

Haneyoshi et al., "Waveform Compensation of PWM Inverter with Cyclic Fluctuating Loads", 1986 Industry Applications Society Annual Mtg., Denver, Colo., Sep. 28-Oct. 3, pp. 744-751.

Primary Examiner—Stephen M. Baker
Attorney, Agent, or Firm—Rothwell, Figg, Ernst & Kurz

[57] ABSTRACT

In an active filter device, control deviation signal between current command value and feedback signal is inputted to a learning control circuit, and in the learning control circuit the control deviation signal having early phase with respect to the current command value by phase corresponding to delay time of the feedback signal is added per one period and outputted as a correction signal, and a current correction command value determined by adding the correction signal to the current command value is inputted as a current command value of the active filter.

3 Claims, 4 Drawing Sheets

ACTIVE FILTER DEVICE

BACKGROUND OF THE INVENTION

1. Field of the Invention

The present invention relates to an active filter device constituted by a PWM (Pulse Width Modulation) inverter.

2. Description of the Prior Art

FIG. 1 is a circuit diagram of an active filter device in the prior art disclosed, for example, in "Study report of the institutes of electrical and information engineers of Japan in 1984" (Outdoor self-cooling voltage type active filter) published in Apr. 1984.

In FIG. 1, numerals 1a to 1c designate a three-phase AC power source 1, numerals 2a to 2c designate reactors, numerals 3a to 3f designate transistor switches, numeral 4 designates a capacitor, and numeral 5 designates an active filter which is constituted by the transistor switches 3a to 3f and the capacitor 4. The active filter 5 is connected through the reactors 2a to 2c to the three-phase AC power source 1.

Numerals 6a to 6c designate current transformers for detecting input currents of the active filter 5, numeral 7 designates a harmonic current generating load, and numerals 8a to 8c designate current transformers which detect currents flowing in the harmonic current generating load 7.

Numerals 9a to 9c designate fundamental wave removing circuits, numerals 10a to 10c designate arithmetic circuits, and numerals 11a to 11c designate amplifier circuits which amplify outputs of the arithmetic circuits 10a to 10c in multiples of K.

Numerals 12a to 12c designate arithmetic circuits, and numeral 13 designates a PWM wave generating circuit. The current transformers 6a to 6c for detecting input currents, the harmonic current generating load 7, the current transformers 8a to 8c, the fundamental wave removing circuits 9a to 9c, the arithmetic circuits 10a to 10c, the amplifier circuits 11a to 11c, the arithmetic circuits 12a to 12c and the PWM wave generating circuit 13 constitute a control circuit. Each output of the PWM wave generating circuit 13 is outputted to the bases of the transistor switches 3a to 3f, and turns the transistor switches 3a to 3f on or off.

Next, operation will be described.

Currents $I_La$ to $I_Lc$ flowing in the harmonic current generating load 7 are detected as currents $I_La^*$ to $I_Lc^*$ through the current transformers 8a to 8c, and are inputted to the fundamental wave removing circuits 9a to 9c.

The fundamental wave removing circuits 9a to 9c are composed of high-pass filters, and remove the fundamental component contained in the currents $I_La^*$ to $I_Lc^*$ and extract harmonic currents $I_{Ra}^*$ to $I_{Rc}^*$ only. The harmonic currents $I_{Ra}^*$ to $I_{Rc}^*$ act as current reference signals to the active filter 5, and active filter output currents Ica* to Icc* detected through the input current transformers 6a to 6c are outputted as feedback currents and subtracting components of the arithmetic circuits 10a to which 10c, and adding operation to the harmonic currents $I_{Ra}^*$ to $I_{Rc}^*$ are applied as adding components; thereby control deviations ΔIa* to ΔIc* are obtained.

The control deviations ΔIa* to ΔIc* are multiplied by K in the amplifier circuits 11a to 11c at the next stage and outputted as adding components of the arithmetic circuits 12a to 12c at the next stage, and addition to the power source voltages Ea to Ec is executed and the summed output is outputted as control signals Ma to Mc to the PWM wave generating circuit 13.

Thereafter in the PWM wave generating circuit 13, the control signals Ma to Mc are compared with triangular carrier signals (not shown), and command for ON-/OFF operation of the base of the transistor switches 3a to 3f are outputted. Corresponding to this, the transistor switches 3a to 3f charge the capacitor 4 and the charged voltage $E_1$ is subjected to PWM modulation, thereby inverter output voltages $E_{Fa}$ to $E_{Fc}$ are generated and compensation currents Ica to Icc flow at the power source side.

Consequently, if the gain K of the amplifier circuits 11a to 11c is made sufficiently large, the compensation currents Ica to Icc and the harmonic currents $I_{Ra}^*$ to $I_{Rc}^*$ become nearly equal, and the harmonic currents flowing in the harmonic current generating load 7 can be compensated by the compensation currents Ica to Icc.

Since the active filter device in the prior art is constituted as above described, on account of overhead time by upper and lower arm short circuit preventing dead time of the PWM wave generating circuit 13, mainly, overhead time by the ON-time and the OFF-time of the transistor switches 3a to 3f, and time delay by the offset of circuits such as the amplifier circuits 11a to 11c or the arithmetic circuits 12a to 12c, the active filter output current feedback signals Ica* to Icc* are delayed with respect to the harmonic current reference signals $\Delta I_{Ra}^*$ to $\Delta I_{Rc}^*$; thereby the harmonic compensation capacity of the active filter device, particularly the compensation capacity of higher harmonic current, may be reduced.

SUMMARY OF THE INVENTION

In order to solve the above-mentioned problems, an object of the invention is to provide an active filter device wherein feedback current can follow the current command value without delay; thereby the compensation capacity of higher harmonic current is obtained.

An active filter device according to the invention comprises an arithmetic circuit which calculates a deviation signal between a current command value and a feedback signal, a learning control circuit which inputs the deviation signal and outputs a correction signal, and an arithmetic circuit which adds the correction signal to the current command value and generates a current correction command value.

The foregoing and other objects and advantages of the invention will become clear by the following description taken in connection with the accompanying drawings.

DETAILED DESCRIPTION OF THE PREFERRED EMBODIMENTS

Figure 1:
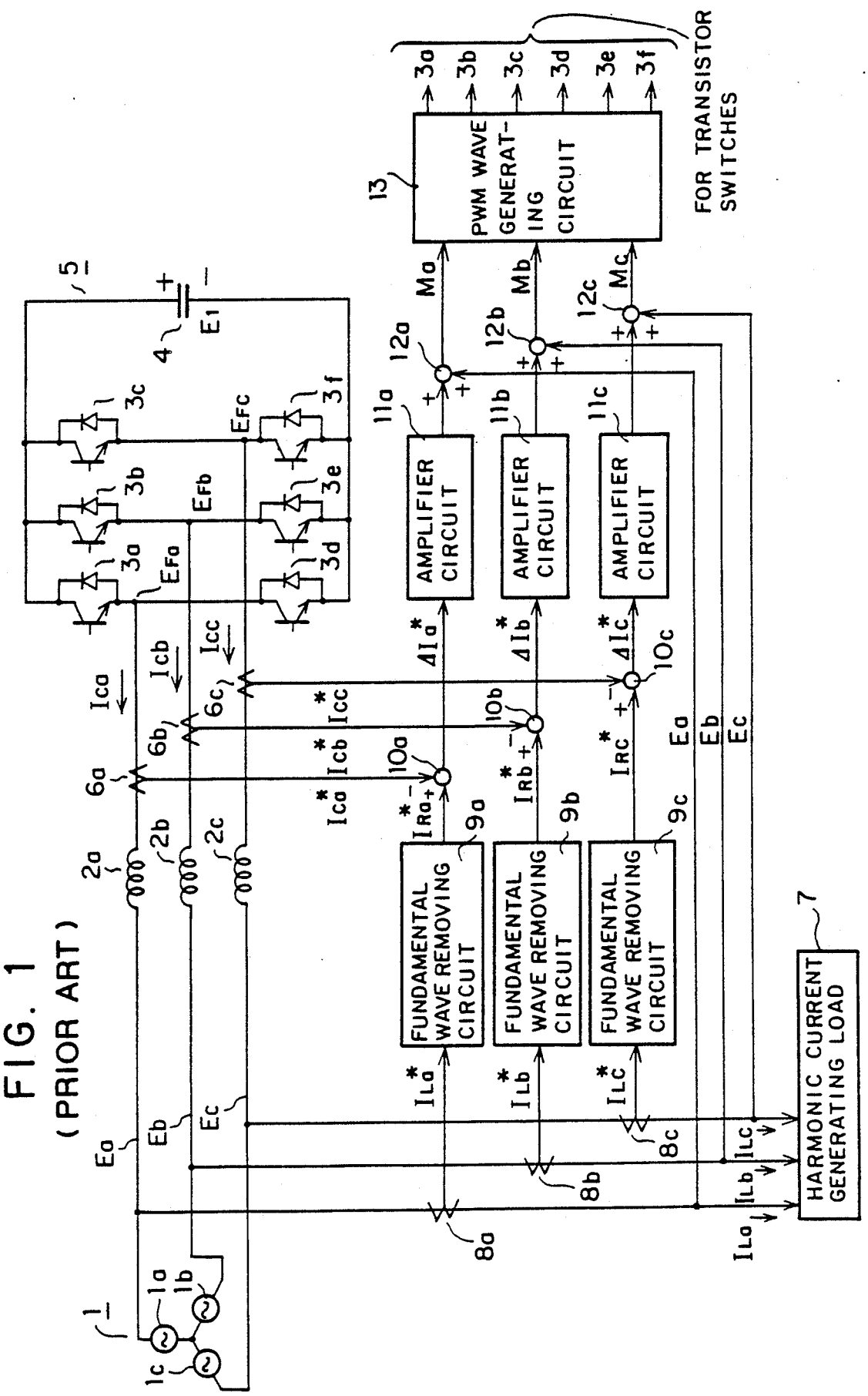
FIG. 1 is a circuit constitution diagram of an active filter device in the prior art.
Figure 2:
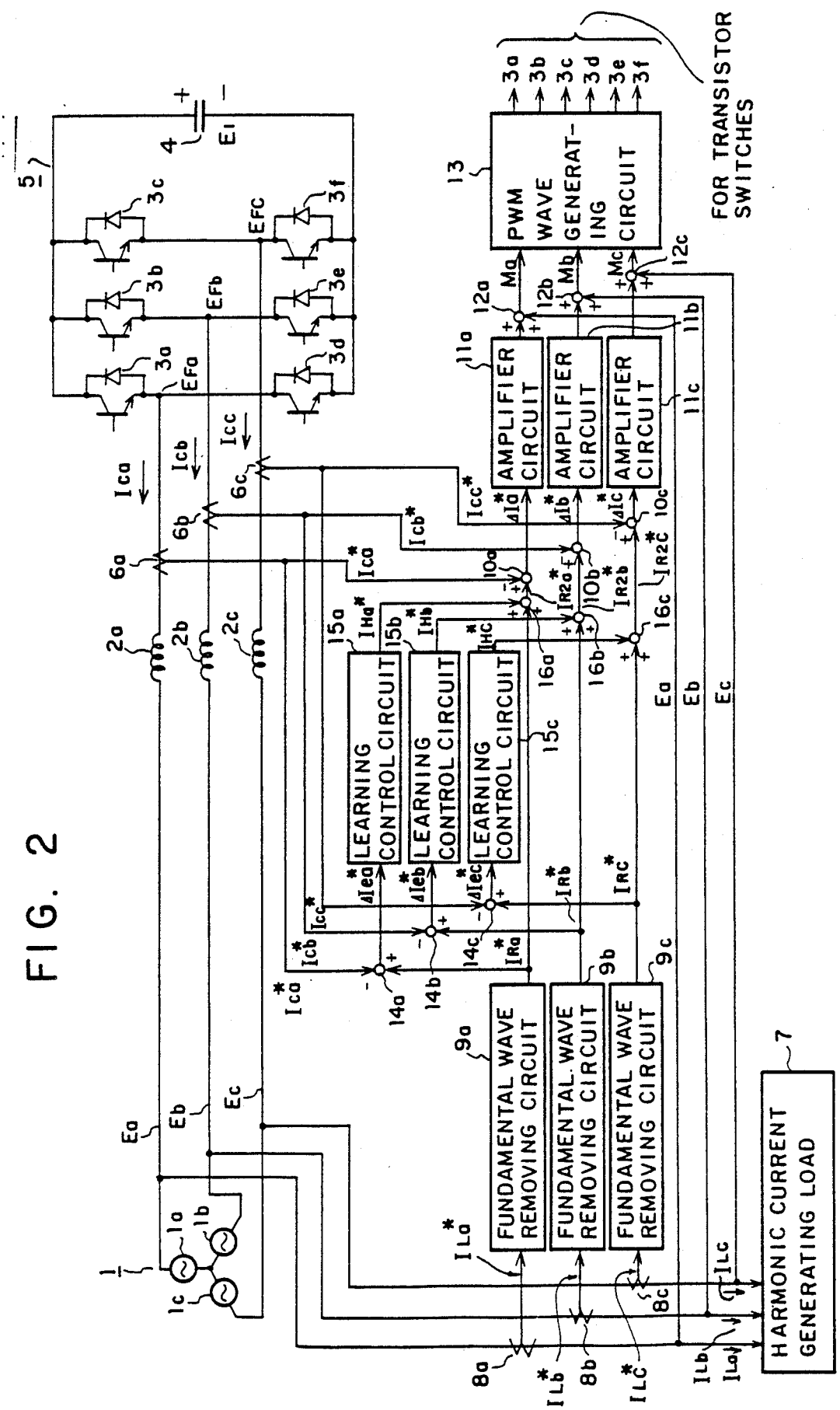
FIG. 2 is a circuit constitution diagram of an active filter device as an embodiment of the invention.

An embodiment of the invention will now be described referring to FIG. 2 and FIG. 3. In FIG. 2, parts designated by reference numerals 1 to 13 are similar to those designated by the same numerals in the prior art shown in FIG. 1.

In FIG. 2, numerals 14a to 14c designate arithmetic circuits, numerals 15a to 15c designate learning control circuits, and numerals 16a to 16c designate arithmetic circuits.

Figure 3:
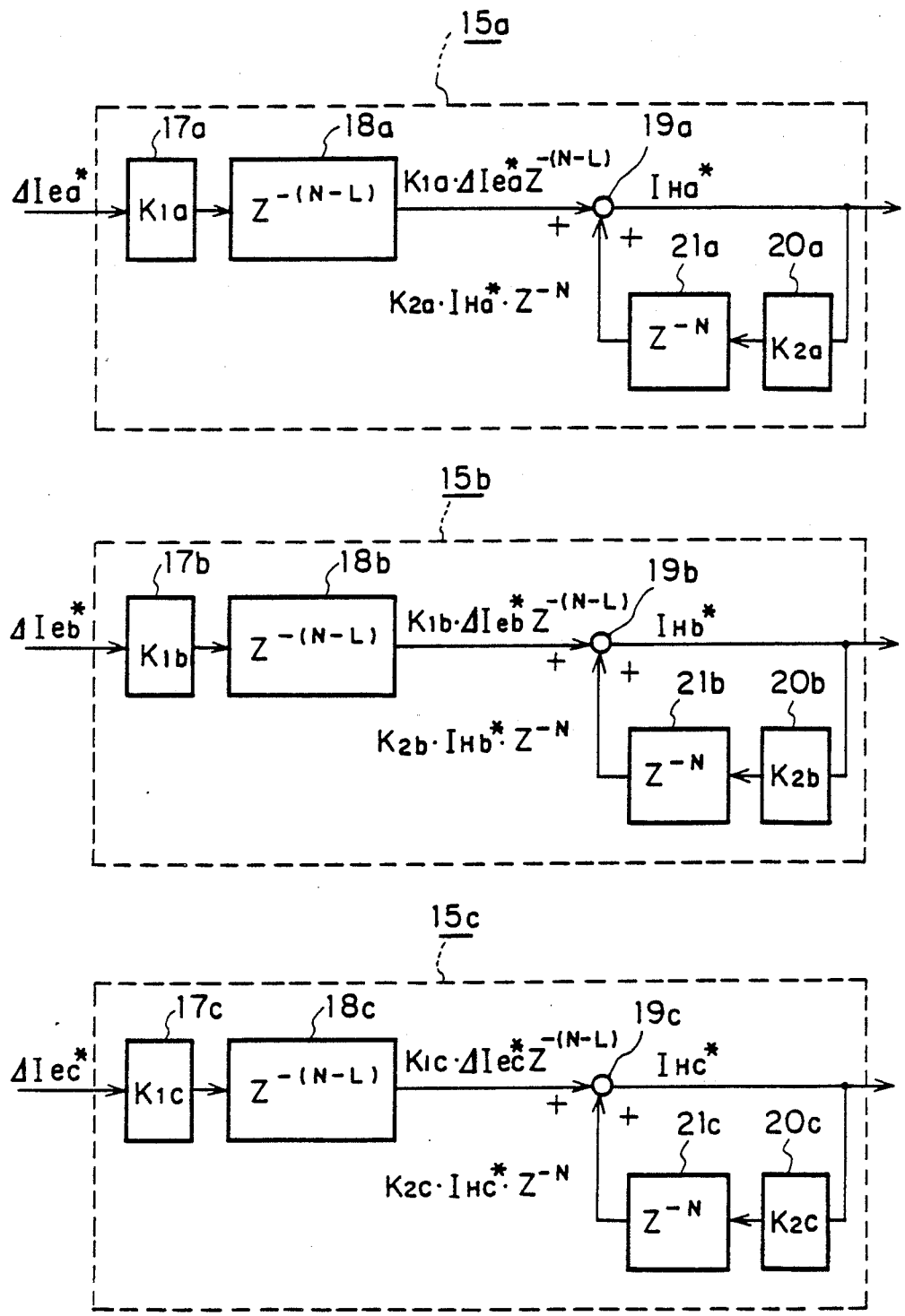
FIG. 3 is a circuit constitution diagram illustrating the constitution of the learning control circuits 15a–15c shown in FIG. 2.

Referring to FIG. 3, the learning control circuits 15a to 15c are composed of amplifier circuits 17a to 17c, first memory circuits 18a to 18c, arithmetic circuits 19a to 19c, amplifier circuits 20a to 20c, and second memory circuits 21a to 21c.

In FIG. 2, load currents $I_La$, $I_Lb$, $I_Lc$ are detected by current transformers 8a, 8b, 8c, and harmonic currents $I_Ra^*$, $I_Rb^*$, $I_Rc^*$ contained in $I_La$ to $I_Lc$ are extracted in fundamental wave removing circuits 9a to 9c and used as current reference signals to control the harmonic currents.

On the other hand, currents Ica, Icb, Icc flowing in an active filter 5 are detected by current transformers 6a to 6c, and the detected signals are made Ica*, Icb*, Icc* and inputted to arithmetic circuits 14a to 14c respectively. In the arithmetic circuits 14a to 14c, deviations $\Delta Iea^*$, $\Delta Ieb^*$, $\Delta Iec^*$ between the harmonic current reference signals $I_Ra^*$ to $I_Rc^*$ and the active filter currents Ica to Icc are calculated, and then the results are inputted to the learning control circuits 15a to 15c at the next stage.

Figure 4:
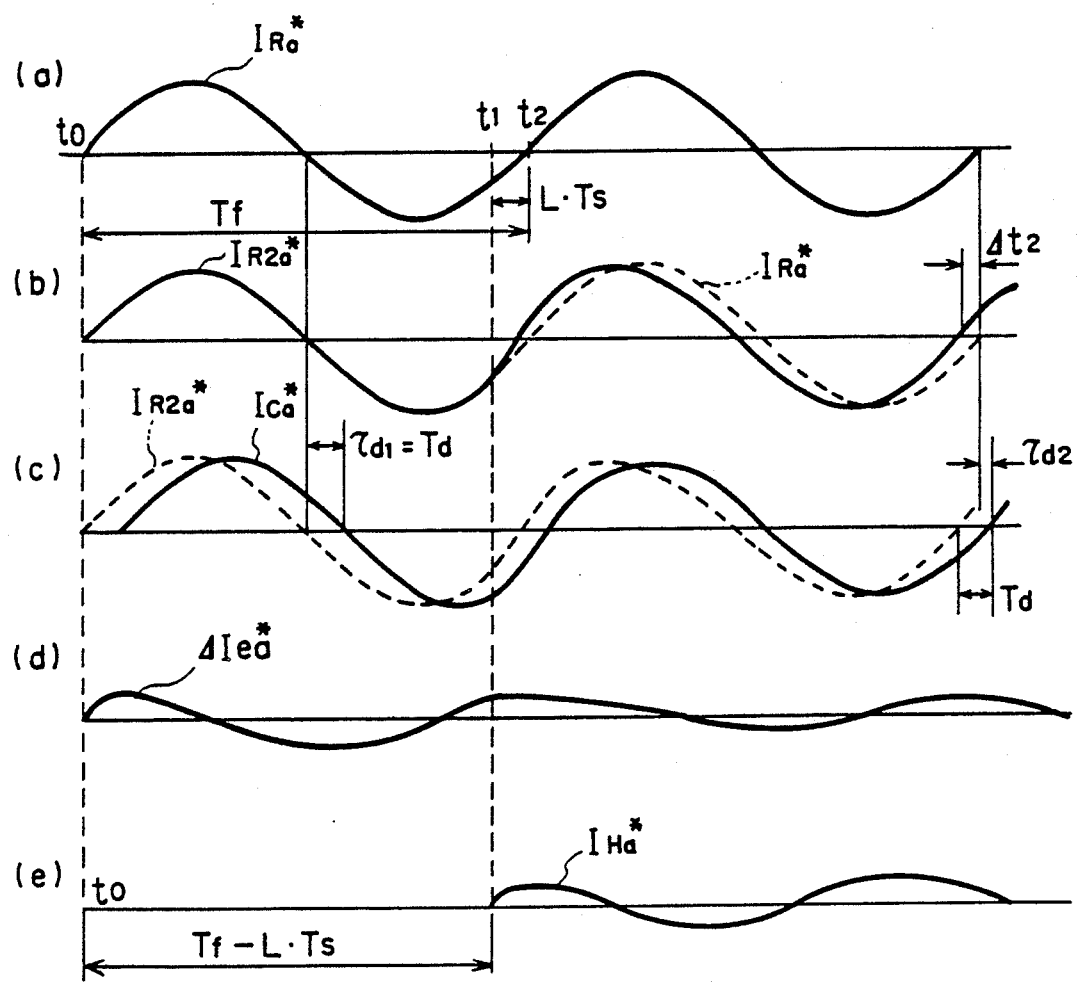
FIG. 4 is a waveform chart for explaining the operation of an active filter device of the invention.

In the learning control circuits 15a to 15c, as shown in FIG. 3, the deviation signals $\Delta Iea^*$, $\Delta Ieb^*$, $\Delta Iec^*$ are amplified by the amplifiers 17a to 17c in multiples of gains K1a to K1c, and further stored in the first memory circuits 18a to 18c and read in delay by time $(N-L)\cdot Ts$, wherein Ts is a sampling period of the first memory circuits 18a to 18c. N is a number which, when multiplied by Ts, gains a value of one period of the current command value, Tf, as shown in FIG. 4, such that Ts = Tf/N. Also L is an adjusting element of the delay time at the read state.

Consequently, the delay time $T_A$ at the read state in the first memory circuit can be expressed as follows:

$$T_A = (N-L)\cdot Tx = N\cdot Ts - L\cdot Ts = Tf - L\cdot Ts \quad (1)$$

That is, the deviation signals $\Delta Iea^*$, $\Delta Ieb^*$, $\Delta Iec^*$ are delayed by a time $(Tf - L\cdot Ts)$ in the first memory circuit. In this case, $L\cdot Ts$ is selected nearly equal to the action delay time $T_D$ of the active filter.

Outputs of the first memory circuits 18a to 18c are inputted to the arithmetic circuits 19a to 19c at the next stage, and added to outputs of the second memory circuits 21a to 21c; thereby $I_Ha^*$ to $I_Hc^*$ are outputted respectively. The second memory circuits 21a to 21c are those where the outputs $I_Ha^*$ to $I_Hc^*$ prior thereto by one period are multiplied by gains K2a to K2c in the amplifier circuits 20a to 20c respectively and then stored.

The control action of the above-mentioned learning control circuits can be expressed by the following formulas.

$$I_Ha^*(\tau)n = K2a\cdot I_Ha^*(\tau)n-1 + K1a\cdot \Delta Iea^*(\tau+L)$$

$$I_Hb^*(\tau)n = K2b\cdot I_Hb^*(\tau)n-1 + K1b\cdot \Delta Ieb^*(\tau+L) \quad (2)$$

$$I_Hc^*(\tau)n = K2c\cdot I_Hc^*(\tau)n-1 + K1c\cdot \Delta Iec^*(\tau+L)$$

Wherein letter $\tau$ within parentheses is the step number representing phase $2\pi(\tau/N)$ by dividing the power source voltage fundamental period Ts equally in N, and N integers from 0 to (N−1). Suffix at the lower right side, such as n, (n−1), represents the order of the period of the current command value, and (n−1)th period is prior to n-th period by one period.

The outputs $I_Ha^*$ to $I_Hc^*$ of the learning control circuits 15a to 15c are added to the harmonic current reference signals $I_Ra^*$ to $I_Rc^*$ in the arithmetic circuits 16a to 16c, and inputted as new harmonic current reference signals $I_R2a^*$ to $I_R2c^*$ into the arithmetic circuits 10a to 10c; thereby deviations $\Delta Ia^*$ to $\Delta Ic^*$ to the output current signals Ica* to Icc* of the active filter are calculated. The current control operation subsequent to this is similar to the prior art shown in FIG. 1, and the description shall be omitted.

Since the control circuit of the active filter of the invention is controlled as above described, the action delay of the active filter can be compensated by the learning control circuits 15a to 15c.

The compensation function will be described referring to the waveform of FIG. 4.

FIG. 4(a) shows the harmonic current reference signal $I_Ra^*$ of output of the fundamental wave removing circuit 9a. Assume now that the harmonic current reference signal $I_Ra^*$ is outputted from the time $t_o$ shown in FIG. 4(a). Since output of the first memory circuit 18a in the learning control circuit 15a is 0 until the time $t_l$ after lapse of $(Tf-L\cdot Ts)$ from $t_o$, 0 is held as the value of $I_Ha^*$ until the time $t_l$ as shown in FIG. 4(e). Consequently, during period of $t_o$ to $t_l$, the second harmonic current reference value $I_R2a^*$ is equal to the first harmonic current reference value $I_Ra^*$.

If the action delay time of the active filter is made Td, the output current Ica* of the active filter is delayed by Td with respect to the second harmonic current reference signal $I_R2a^*$ and outputted as shown in FIG. 4(c). As a result, the deviation $\Delta Iea^*$ between the harmonic current $I_Ra^*$ of the load and the compensation current Ica* by the active filter is generated as shown in FIG. 4(d). The from learning circuit 15a signal is delayed by $(Tf-L\cdot Ts)$ and outputted as $I_Ha^*$ after the time $t_l$ as shown in FIG. 4(e).

The signal $I_Ha^*$ is added to $I_Ra^*$, and acts to advance the phase of $I_Ra^*$ as shown in FIG. 4(b).

As a result, the deviation signal $\Delta Iea^*$ becomes small after the time $t_l$ as shown in FIG. 4(d). Since $\Delta Iea^*$ after the time $t_l$ is added to $I_Ha^*$ prior thereto by one period as shown by formula (2), $\Delta Iea^*$ becomes 0 at the steady state and the deviation due to the control delay of the active filter can be completely compensated.

Although the embodiment has been described in the application to the active filter device, as clearly seen from the hereinbefore description, the invention can be applied to a current control device having prescribed phase delay intending that its output follow the prescribed target value.

In FIG. 4, even if the order of the amplifier circuits 17a to 17c and the first memory circuits 18a to 18c or the order of the amplifier circuits 20a to 20c and the second memory circuits 21a to 21c is exchanged, or in FIG. 3, even if the order of the amplifier circuits 17a to 17c and the first memory circuits or the order of the amplifier circuits 20a to 20c and the second memory circuits 21a to 21c is exchanged, the effect of the learning control circuit is similar to that of the embodiment.

According to the invention as above described, since the output current of the active filter being in the control delay with respect to the current correction command value becomes coincident with the current command value at the steady state, the harmonic compensation property of the active filter device can be improved.

What is claimed is:

1. An active filter device, comprising:
   an active filter circuit for generating an output current as a function of a current command value;
   a harmonic current generating load for generating a harmonic current in response to said output current;
   first deviation calculation means for calculating a deviation between said output current and said harmonic current and outputting the result as a deviation value;
   a control circuit, comprising a first memory for storing a deviation value delayed by a prescribed amount of time and a second memory for storing a deviation value corresponding to a previous period of said harmonic current, and a first arithmetic circuit for combining the delayed and previous deviation values to produce a compensation value and storing the compensation value in said second memory as said previous deviation value;
   a second arithmetic circuit for adding said compensation value to said harmonic current to produce a compensated harmonic current; and
   second deviation calculation means for calculating a deviation between said output current and said compensated harmonic current to produce said current command value.

2. An active filter device according to claim 1, wherein said prescribed amount of time is equal to the difference between a period of said harmonic current and an action delay time of said active filter device.

3. An active filter device according to claim 2 wherein said active filter comprises a PWM circuit.

* * * * *

UNITED STATES PATENT AND TRADEMARK OFFICE
CERTIFICATE OF CORRECTION

PATENT NO. : 5,063,532

DATED : November 5, 1991

INVENTOR(S) : Masatoshi Takeda et al.

It is certified that error appears in the above-identified patent and that said Letters Patent is hereby corrected as shown below:

On the cover page, left column, second line under Other Publications, "Hanuonic" should be --Harmonic--.

Column 1, line 61, delete "and adding operation" and after "to" insert --which--.

Column 2, line 23, after "13," delete "mainly,".

Column 3, line 35, "gains" should be --gives--;
        lines 57 and 58, "formulas" should be --formulae--;
        line 62, "$I_H a*$" should be --$I_H b*$--.

Column 4, line 40, after "The" insert --signal-- and after "15a" delete "signal".

Signed and Sealed this

Seventeenth Day of August, 1993

Attest:

Attesting Officer

BRUCE LEHMAN

Commissioner of Patents and Trademarks